United States Patent
Petty (10) Patent No.: US 7,990,961 B2
(45) Date of Patent: Aug. 2, 2011

(54) APPARATUS AND METHODS FOR IMPROVED DUAL DEVICE LOOKUP IN A ZONING SAS EXPANDER

(75) Inventor: William K. Petty, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 199 days.

(21) Appl. No.: 12/392,483

(22) Filed: Feb. 25, 2009

(65) Prior Publication Data

US 2010/0215041 A1 Aug. 26, 2010

(51) Int. Cl.
*H04L 12/56* (2006.01)
(52) U.S. Cl. ........ 370/389; 370/392; 370/475; 709/245; 711/2
(58) Field of Classification Search .................. 370/389, 370/392, 470, 471, 475; 709/231, 236, 237, 709/245; 711/2, 108, 111
See application file for complete search history.

(56) References Cited

U.S. PATENT DOCUMENTS

| | | | | |
|---|---|---|---|---|
| 7,668,925 | B1 * | 2/2010 | Liao et al. | 709/212 |
| 2006/0041699 | A1 * | 2/2006 | Day et al. | 710/106 |
| 2006/0101171 | A1 * | 5/2006 | Grieff et al. | 710/36 |
| 2007/0220204 | A1 * | 9/2007 | Nakajima et al. | 711/114 |
| 2008/0120687 | A1 * | 5/2008 | Johnson | 726/1 |
| 2009/0006697 | A1 * | 1/2009 | Doherty et al. | 710/300 |
| 2009/0007155 | A1 * | 1/2009 | Jones et al. | 719/327 |
| 2009/0094620 | A1 * | 4/2009 | Kalwitz et al. | 719/325 |
| 2009/0094664 | A1 * | 4/2009 | Butler et al. | 726/1 |
| 2010/0049919 | A1 * | 2/2010 | Winokur et al. | 711/114 |
| 2010/0115163 | A1 * | 5/2010 | Odenwald et al. | 710/100 |
| 2010/0153639 | A1 * | 6/2010 | Corry et al. | 711/113 |

OTHER PUBLICATIONS

Elliot, "06-0168r0 SAS-2 Open address frame Source Zone Group field definition" Mar. 22, 2006.

* cited by examiner

*Primary Examiner* — Pankaj Kumar
*Assistant Examiner* — Duc T Duong
(74) *Attorney, Agent, or Firm* — Duft Bornsen & Fishman LLP (57) ABSTRACT

Apparatus and methods for full address resolution in a zoning SAS expander. A single memory circuit is used in a zoning SAS expander to store zone information associated with the SAS address (e.g., WWN) of devices exchanging information through the expander. The source and destination addresses in a received SAS frame are used as inputs to the memory circuit to generate outputs of the memory circuit representing the source and destination zone group identifiers. These outputs are then applied to the zone permission table to determine the zoning permission for forwarding the frame through the expander. Pipelined logic within the expander sequences the operations of the memory circuit and the zone permissions table to account for clock cycle delays in processing of each. In one exemplary embodiment, the memory circuit is a content addressable memory (CAM). In another exemplary embodiment, the CAM also includes port routing information.

17 Claims, 6 Drawing Sheets

APPARATUS AND METHODS FOR IMPROVED DUAL DEVICE LOOKUP IN A ZONING SAS EXPANDER

BACKGROUND

1. Field of the Invention

The invention relates generally to zoning serial attached SCSI (SAS) expanders and more specifically relates to improved apparatus and methods within a zoning SAS expander for dual device lookup for zone permissions (also referred to as full address resolution).

2. Discussion of Related Art

SAS domains provide a popular architecture for coupling one or more initiator devices (e.g., computing systems, servers, and storage controllers) to one or more target devices (e.g., storage devices). A SAS domain generally includes one or more SAS initiator devices coupled to one or more SAS target devices through zero or more SAS expanders. SAS expanders provide a plurality of physical ports (PHYs) coupled to a related group of initiator and target devices to permit dynamically switched access among the coupled devices. Further, a SAS expander port may be coupled to a port of another expander to further expand the flexibility and number of devices that may be configured in the SAS domain.

SAS expanders generally operate as switches/routers to allow flexibility in dynamically coupling any of the one or more initiators to any of the one or more targets. SAS frames are generated in an initiator device and forwarded to the port of an expander with which the initiator is directly coupled. SAS addressing information (i.e., worldwide unique names—WWN) in the SAS frame identifying the source device (the SAS initiator) and the destination device (the SAS target) are used by the SAS expander to determine which port to use for forwarding the frame toward the ultimate destination device. A routing table stored in a memory of the expander may be used to translate the WWN for the destination device into a particular port/PHY to which the received frame is forwarded.

SAS standards also include a feature called "zoning". In zoning, an expander includes a zone permission table that indicates whether the source device identified in the received frame is allowed to connect with the destination device identified in the received frame. One or more zone groups are defined such that devices are configured as members of one or more of the defined zone groups and devices in a first group are configured in the zone permission table to allow or disallow access to devices in other groups.

As presently defined by the SAS standards the zone group of a destination device is determined by a lookup table within the expander (e.g., the routing table may be enhanced with zoning information). Such a lookup table is used by the SAS expander to determine, for example, the zone group assigned to the destination device and the port/PHY through which the received frame is to be forwarded to reach the destination device. The zone group assigned to the source device of the frame is simply determined by the port/PHY on which the frame is received or from the zone group specified as the source zone group in the received frame. The zone permission table, as presently specified in the SAS standards, is then used to map the source and destination zone groups so determined to determine whether permission is granted for the received frame to be forwarded through the expander to the destination device. Thus as presently practiced, zoning expanders resolve only the destination device identifier in a received frame through use of the lookup table (i.e., routing table) to determine the ultimate zone permission. The zone group of the source device is not determined by any mapping of the source device address but rather is determined solely from the port on which a frame is received or from the information in the received frame.

Limitations of presently specified zoning operations of a SAS expander are limited in that a zoning SAS expander (i.e., in a first zoned portion of a service delivery subsystem—ZPSDS) cannot fully resolve the zone permissions for end devices coupled through a non-zoned expander. For example, a zoning expander in accordance with present SAS standards may be coupled to an older ("legacy") enclosure of storage devices with an internal expander (e.g., just a box of disks—JBOD) that is not capable of zoning. Under present SAS standards, all devices in that legacy enclosure must be associated with the same zone group. No further granularity of the zone groups is possible.

It has been proposed that SAS standards be improved to call for (optional) full address resolution for zoning permission determination. In other words, it has been proposed to standardize a feature in a SAS expander that uses the WWN of both the source and destination devices (as provided in a received SAS frame) to be resolved and to thereby determine zone permission regardless of the port/PHY on which the frame is received and regardless of the zone groups identified in the received frame information. However, no such standard has yet been adopted. More importantly, no cost-effective, simple solution has yet been proposed to provide for such a full address resolution in a zoning SAS expander.

Thus it is an ongoing challenge to provide full address resolution in a zoning SAS expander in a simple, cost-effective manner.

SUMMARY

The present invention solves the above and other problems, thereby advancing the state of the useful arts, by providing methods and systems for resolving both the zone group for the source device and the zone group for the destination device of a received frame in a zoning SAS expander based on the device addresses in the received frame before application of the zone groups to a permission table. In accordance with features and aspects hereof, an address resolution circuit/method in an enhanced SAS expander is used to resolve both the source device identifier to determine a source zone group and to resolve the destination device identifier to determine a destination zone group for each received frame. Advantageously, the enhanced zoning expander in accordance with features and aspects hereof enables the enhanced zoning expander to provide distinct zone group definitions for each source and destination devices—even those coupled through an older (legacy), non-zoning expander (such as in a JBOD).

In one embodiment, a single memory device is used for the lookup table used to resolve both the source and destination addresses to generate corresponding zone group identifiers. In an exemplary embodiment, the memory circuit may be a content addressable memory (CAM). In another exemplary embodiment, the memory circuit may store the zone information for source and destination devices in conjunction with the routing information relating to destination devices.

In one aspect hereof, a method is provided for resolving source and destination information in a zoning SAS expander. The method includes receiving a frame, the frame including a source identifier identifying the source device and including a destination identifier identifying a destination device. The method also includes resolving the source identifier to generate a source zone group identifier and resolving the destination identifier to generate a destination zone group identifier. The method then applies the source zone group identifier and the destination zone group identifier to a zone permission table of the zoning SAS expander to determine if forwarding of the frame to the destination device is permitted based on the source zone group identifier and the destination zone group identifier. The method then forwards the frame to the destination device responsive to a determination that forwarding of the frame is permitted.

Another aspect hereof provides circuitry in a zoning SAS expander for full zone group identifier resolution in the zoning SAS expander. The circuitry includes a memory circuit adapted to store zone group identifier information for resolving a device identifier the memory circuit adapted to generate a device zone group identifier output in response to application of a device identifier input. The circuitry further includes control logic coupled with the memory circuit. The control logic adapted to apply a source identifier in a received SAS frame as an input to the memory circuit to generate a source zone group identifier and adapted to apply a destination identifier in the received SAS frame as an input to the memory circuit to generate a destination zone group identifier. The circuitry also includes a zone permission table coupled with the control logic and coupled with the memory circuit. The zone permission table adapted to receive the source zone group identifier output and the destination zone group identifier output and adapted to determine if the received SAS frame may be forwarded to the device identified by the destination identifier based on the source zone group identifier and the destination zone group identifier. The control logic is further adapted to forward the received SAS frame to the device identified by the destination identifier only if the zone permission determines that the received SAS frame may be forwarded to the device identified by the destination identifier.

Still another aspect hereof provides a zoning SAS expander that includes a first port coupled to receive a SAS frame from a source device, a second port coupled to forward a received frame to a destination device, a content addressable memory (CAM) adapted to store zone group identifier information associated with identified devices, and a zone permission table adapted to receive a source zone group identifier associated with a source device identified by a source identifier and adapted to receive a destination zone group identifier associated with a destination device identified by a destination identifier. The zone permission table is adapted to determine if a received SAS frame may be forwarded from a source device to a destination device based on a received source zone group identifier and based on a received destination zone group identifier. The expander further includes control logic coupled with the first port and the second port and coupled with the CAM and coupled with the zone permission table. The control logic adapted to receive a SAS frame on the first port, adapted to apply a source identifier in the received SAS frame as an input to the CAM to generate a source zone group identifier, and adapted to apply a destination identifier in the received SAS frame as an input to the CAM to generate a destination zone group identifier. The control logic is further adapted to apply the source zone group identifier to the zone permission table and to apply the destination zone group identifier to the zone permission table. The control logic is further adapted to forward the received SAS frame to the device identified by the destination identifier only if the zone permission determines that the received SAS frame may be forwarded to the device identified by the destination identifier.

DETAILED DESCRIPTION OF THE DRAWINGS

Figure 1:
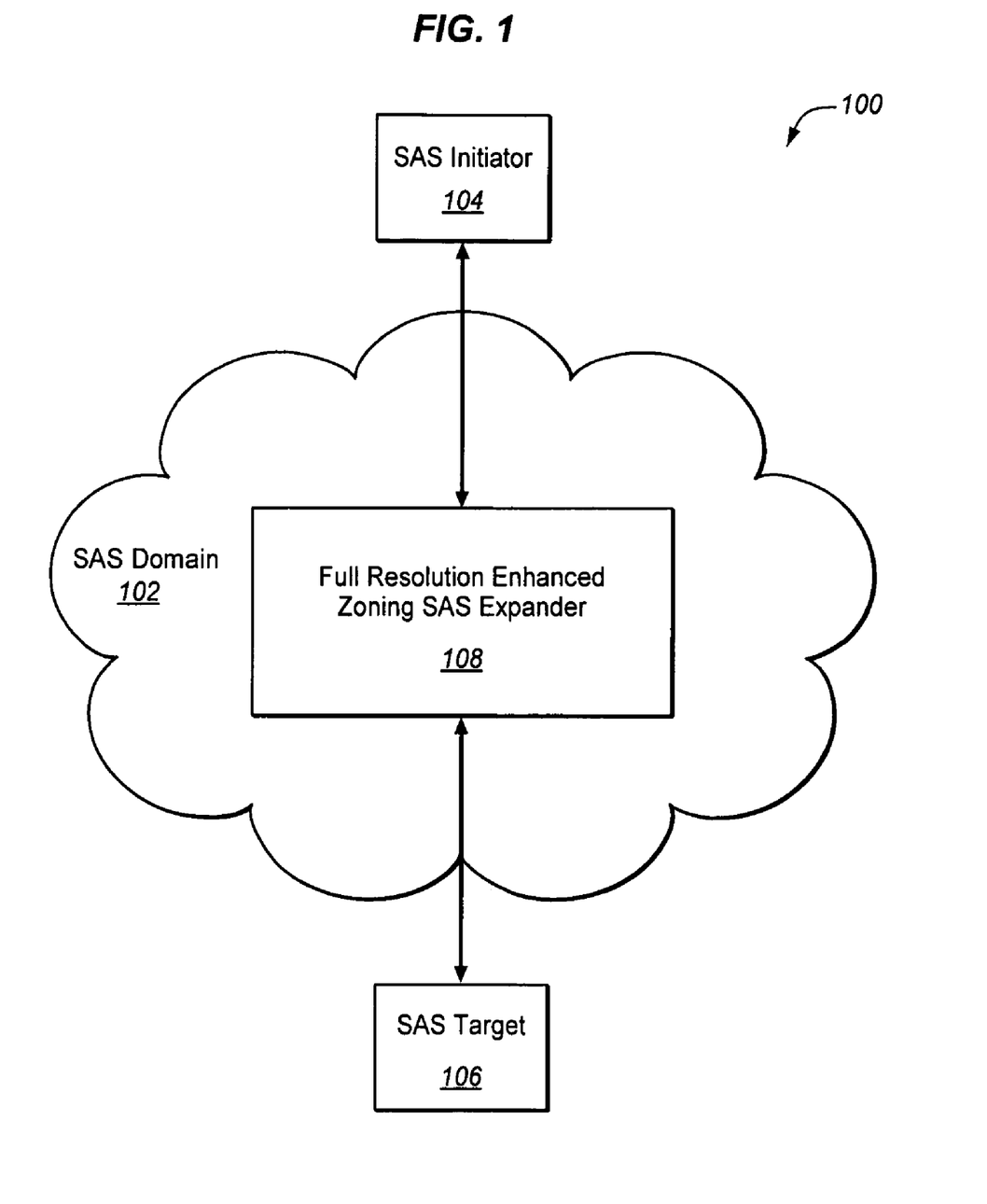
FIG. 1 is a block diagram of an exemplary system including an enhanced zoning SAS expander in accordance with features and aspects hereof.

FIG. 1 is a block diagram of a system 100 including an enhanced zoning SAS expander 108 coupled between a SAS initiator 104 and a SAS target 106. As generally known in the art, SAS domain 102 may comprise one or more SAS expanders 108. Thus while enhanced zoning SAS expander 108 is shown as though it is directly coupled with SAS initiator 104 and SAS target 106 it will be well understood that such coupling may be indirect through any number of additional SAS expanders of SAS domain 102. Therefore, enhanced zoning SAS expander 108 is coupled with SAS initiator 104 through a port of expander 108 and any number of additional SAS expanders intermediate the port of expander 108 and SAS initiator 104. In like manner, expander 108 is coupled through another port with SAS target 106 through any number of additional intermediate SAS expanders.

In accordance with features and aspects hereof, SAS expander 108 is enhanced by providing full address resolution in making zone permission determinations. As generally known in the art, SAS zoning features associate a zone group identifier (zone group ID) with each device coupled with a zoning SAS expander. A matrix of Boolean values defines which zone group identifiers may communicate with which other zone group identifiers. In other words, a Boolean matrix typically referred to as a zone permission table indicates whether devices associated with a first zone group ID may communicate with devices associated with a second zone group ID. As noted above, prior implementations presume that the zone group identifiers associated with an initiating source device may simply be determined by the port/PHY of the expander on which a SAS frame is received or from the zone group information encoded in the received frame. Thus, in prior zoning expanders, only the destination device identifier specified in a received SAS frame is inspected to determine the zone group identifier associated with the destination device. In such prior expanders, the source zone group ID (associated with the port/PHY on which the frame is received or extracted from the received frame) and the destination zone group (determined by lookup of the destination device address) are applied to the zone permission table to determine whether the initiating device has permission to communicate with the identified destination device.

By contrast, the enhanced, full address resolution, zoning SAS expander 108 of system 100 performs full address resolution by determining the source zone group identifier corresponding to the source device identifier/address in a received frame as well as the destination zone group identifier associated with the destination device identifier/address in a received frame. Both the source zone group identifier and the destination zone group identifier are determined by address resolution of the devices identified in each received frame and then such determined zone group identifiers are applied to the zone permission table to correctly determine the permission for the devices identified as the source and destination in each received frame.

Figure 2:
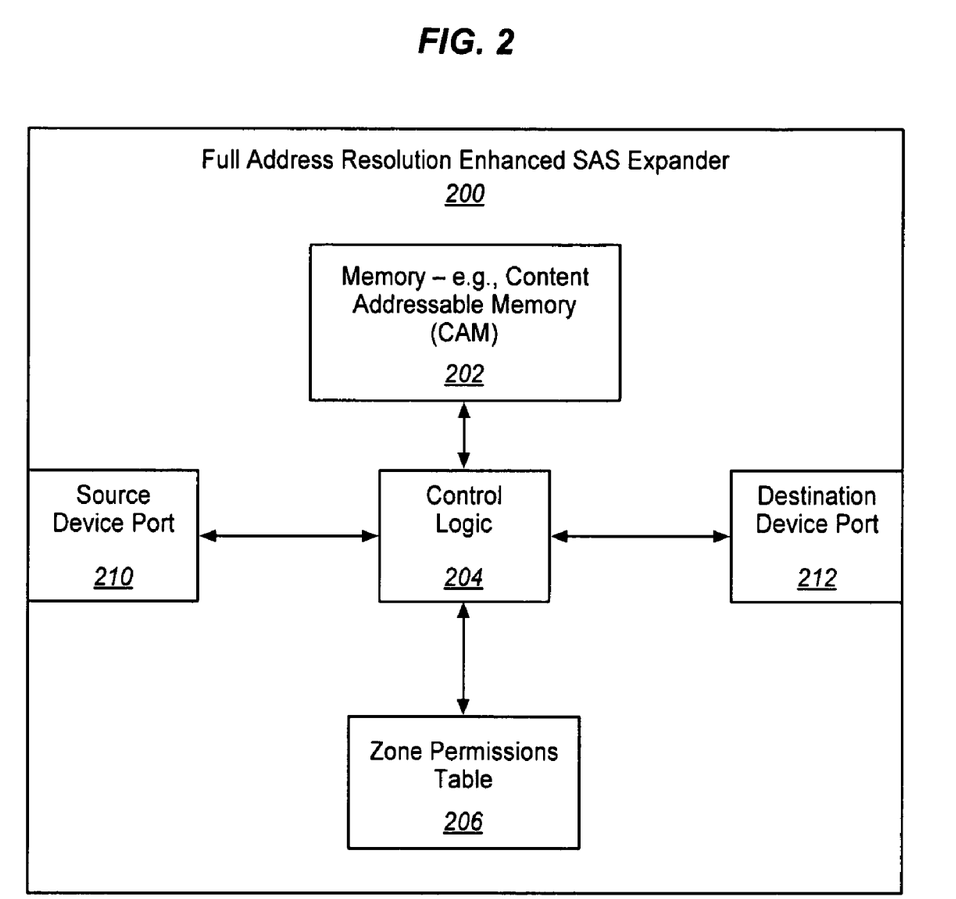
FIG. 2 is a block diagram of an exemplary enhanced zoning SAS expander in accordance with features and aspects hereof.

FIG. 2 is a block diagram describing an exemplary full address resolution enhanced zoning SAS expander 200 as may be utilized in system 100 of FIG. 1. Expander 200 includes a source device port 210 for coupling with a source device (e.g., a SAS initiator coupled with the enhanced SAS expanders through zero or more other expanders of the SAS domain). Enhanced SAS expander 200 also includes a destination device port 212 for coupling with a destination device (e.g., a SAS target device coupled with the enhanced SAS expander through zero or more other expanders of the SAS domain). Zone permissions table 206 provides the two-dimensional matrix of Boolean values indicating whether devices associated with each possible zone group identifier may communicate with other devices associated with other zone group identifiers. Each zone group ID is associated with a row and with a column of the matrix. The rows, for example, may correspond to source zone group IDs and the columns correspond to destination zone group IDs. The Boolean value at each position of the matrix indicates whether devices associated with the zone groups of that row (e.g., source devices) and column (e.g., destination devices) are allowed to communicate.

In accordance with features and aspects hereof, enhanced SAS expander 200 includes a memory circuit 202 coupled with control logic 204. Control logic 204 is coupled with the source device port 210, the destination device port 212, and the zone permissions table 206 to provide full address resolution of both the source device identifier and the destination device identifier in each received frame. The source and destination device identifiers in each received frame art translated through the memory circuit 202 to determine the zone group identifier associated with each device. By performing full address resolution, the zone permission may be more accurately determined based upon the devices identified in the frame rather than, as previously practiced, relying on the port on which a frame is received to indicate the zone group identifier associated with the presumed source device.

The true source and destination zone group identifiers so determined through control logic 204 and memory circuit 202 are then applied by control logic 204 to zone permissions table 206 to determine whether a received frame is allowed to be forwarded from the device coupled to the source device port 210 to a device coupled with destination device port 212.

In one exemplary embodiment, memory circuit 202 may be a content addressable memory (CAM) such that the source device identifier and destination device identifier may be applied as inputs to the memory circuit (CAM) 202 and a zone group identifier associated with each device is generated as an output from the content addressable memory circuit 202. In addition, in another exemplary embodiment, content addressable memory circuit 202 may also store routing information associated with a identified destination device such that the single CAM circuit 202 may be used both for translating the destination device identifier to determine the associated destination zone group ID and may also be utilized to determine the preferred routing to the destination device through one or more ports of the expander 200. Still further alternative embodiments may provide multiple memories for storing different aspects of the translation. For example, a first content addressable memory may provide routing information to translate the source of destination device identifier into a corresponding port or PHY of the expander through which the corresponding device is coupled. The port so identified may then be applied to a second memory for translation into a corresponding zone group identifier. Still other memory circuits may be utilized for storing the routing information utilized within the SAS expander 200 to determine a port or PHY to which a received frame is to be forwarded for eventual transmission to the identified destination device. Those of ordinary skill in the art will readily recognize numerous equivalent memory structures that may be utilized to provide the desired translation of both a source device identifier and destination device identifier into corresponding zone group identifiers. In one aspect hereof, only a single memory is needed for the translation of both the source and destination devices/port into corresponding zone group IDs.

Figure 3:
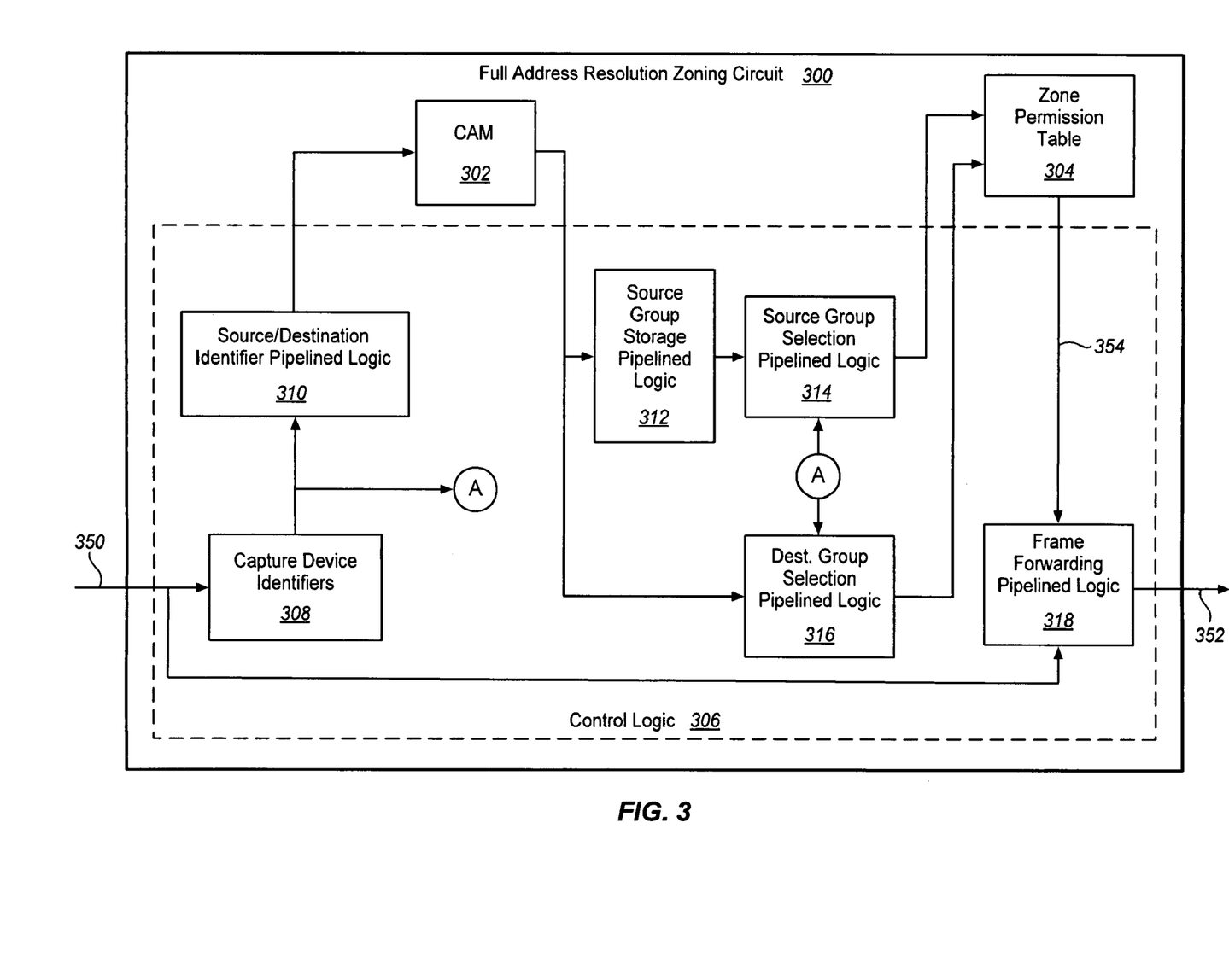
FIG. 3 is a block diagram of an exemplary full address resolution zoning circuit in accordance with features and aspects hereof as may be utilized in an enhanced zoning SAS expander such as in FIGS. 1 and 2.

FIG. 3 is a block diagram of an exemplary full address resolution zoning circuit 300 as may be utilized in an enhanced SAS expander such as expander 200 of FIG. 2. The full address resolution zoning circuit 300 may include a content addressable memory 302 and a zone permission table 304 both coupled with control logic 306. Control logic 306 coordinates use of the CAM 302 to translate both a source device identifier and a destination device identifier into corresponding zone group identifiers. The zone group identifiers so determined are then applied by control logic 306 to zone permission table 304 to determine the configured permission of the zoning SAS expander to forward the received frame to an appropriate port for eventual transmission to the identified destination device.

In general, control logic 306 receives a frame on path 350 from a corresponding source port coupled with a SAS initiator that generated the received frame. The initiator may be coupled to the source port of the expander through zero or more other intervening expanders of the SAS domain. The source and destination device identifiers encoded within the received frame are extracted by operation of control logic 306 and applied to CAM 302 to determine the corresponding source zone group identifier and a destination zone group identifier, respectively. Control logic 306 receives the determined source zone group identifier and the determined destination zone group identifier from CAM 302 and applies both to zone permissions table 304 to determine the permission for forwarding the received frame to the identified destination device.

Since both the source zone group identifier and the destination zone group identifier are encoded within CAM 302, control logic 306 must assure proper sequencing of application of the source device identifier and the destination device identifier to CAM 302 and must retain or store the first determined zone group identifier (e.g., the source zone group identifier) while CAM 302 is operable to determine the second zone group identifier (e.g., the destination zone group identifier). More specifically, control logic 306 includes pipelined logic to properly sequence the application of a source device identifier to CAM 302, to save the resultant source zone group identifier, and then subsequently apply the destination device identifier to CAM 302 to generate the destination zone group identifier. The stored source zone group identifier and the destination zone group identifier are then applied at the proper time as inputs to zone permission table 304 (e.g., as a row index and a column index, respectively) to determine whether the received SAS frame may be forwarded to the device identified in the frame by the destination device identifier.

The pipelined logic within control logic 306 assures orderly sequencing of the translation of both the source device identifier into a corresponding source zone group identifier and the destination device identifier into a corresponding destination zone group identifier. More specifically, control logic 306 may include a capture or storage element 308 for capturing (e.g., latching) device identifiers in a received frame. The captured device identifiers may be applied to source/destination identifier pipelined logic 310 at appropriate times for application to as input to CAM 302. For example, on a first clock cycle responsive to receipt of the SAS frame, the source device identifier in the received SAS frame may be extracted by capture logic 310 and applied to CAM 302 as input. Presuming that CAM 302 requires one full clock cycle to process the applied input, source/destination identifier pipelined logic 310 then waits for a next clock cycle for CAM 302 to complete its processing of the applied source device identifier and then applies the destination device identifier as a next input to CAM 302 on the next clock cycle. Those of ordinary skill in the art will readily recognize that although not depicted in FIG. 3, all elements of the zoning circuit 300 may operate utilizing a common, ubiquitous clock signal.

CAM 302 generally comprises a table of information indexed by the applied device identifier to generate a corresponding zone group identifier for the device. In other words, a device identifier (e.g., a SAS WWN for a source device or a destination device in a SAS frame) is applied to CAM 302 as input and the resultant output of CAM 302 is the zone group ID associated with the applied device identifier. Those of ordinary skill in the art will readily recognize numerous circuit structures for implementation of CAM 302. In addition to some commercially available discrete components implementing a CAM, a variety of standard cell libraries used in commercial electronic design systems include standard cell circuits for a content addressable memory. Alternatively, such a content addressable memory may be designed as a semi-custom or full-custom application specific integrated circuit utilizing register files and comparator logic or other suitable logic and memory structures. In addition, CAM 302 may be designed to operate within a single clock cycle or may require multiple clock cycles for its operation as a matter of design choice. Thus source/destination identifier pipelined logic 310 is adapted to sequence the application of the source device identifier and the destination device identifier in accordance with the requirements of the design of CAM 302.

Source group storage pipelined logic 312 receives the resultant output of CAM 302 and saves/stores the source zone group identifier thus generated for later utilization in a subsequent pipelined clock cycle. Destination group selection pipelined logic 316 receives the output of CAM 302 when the destination zone group is determined by CAM 302. Destination group selection pipelined logic 316 also receives the destination zone group (label "A") extracted from the SAS received frame by logic 308. Source group selection pipelined logic 314 receives the stored source zone group from pipelined logic 312 and also receives the source zone group (label "A") extracted from the received SAS frame by element 308. Source group selection pipelined logic 314 then selects either the stored source zone group ID (received from logic 312) or the source zone group extracted from the SAS frame (by logic 308) for application as a the source zone group to zone permission table 304. At the same time, destination group selection pipelined logic 316 selects between the resolved destination zone group identifier generated as output of CAM 302 or the captured destination zone group identifier (received from logic 308) for application to the zone permission table 304 as the destination zone group identifier.

Pipelined logic elements 312, 314, and 316 are all designed to impose any requisite clock delays in their respective function to assure that the selected source zone group identifier and the selected destination zone group identifier are applied to the zone permission table 304 at the appropriate time. In other words, pipelined logic elements 312, 314, and 316 are all designed to adapt to the operation of CAM 302 to receive the source and destination zone group identifiers at appropriate times and save/store the first resolved identifier (e.g., the source) until the second zone group identifier (e.g., the destination) is resolved.

Selection pipelined logic 314 and 316 may make their respective selections based on configuration parameters provided by an administrative user. A computer interface (not shown) allows an administrative user to configure the selection criteria for logic 314 and 316. In addition, such a computer interface allows an administrative user to program the entries in CAM 302 in accordance with the zoning requirements and configuration of the particular SAS domain application. In alternative embodiments, the configuration parameters used to select among the various possible zone group identifiers for both the source and destination may be configured by another device coupled to the expander within the SAS domain. For example a suitable enhanced SAS initiator may program these selection options of the zoning expander through suitably formatted SAS frames (e.g., through use of the SCSI management protocol (SMP) or other suitable management protocols). Such design choices for obtaining the configuration options for the selection logic (314 and 316) as well as programming of suitable configuration registers will be readily apparent to those of ordinary skill in the art.

Lastly, the output of zone permission table 304 is applied via path 354 to frame forwarding pipelined logic 318 to forward a received frame via path/port 352 to the destination device identified in the received SAS frame only if the zone permission table 304 output signal indicates permission is granted to do so. Otherwise the received frame is not forwarded to the identified destination device and an appropriate rejection is returned to the originating source device. Logic 318 is also suitably designed for requisite clock delays to allow for the operation of zone permission table 304. In other exemplary embodiments where the zoning circuit 300 is integrated with other existing logic of the SAS expander, the output signal on path 354 from zone permissions table 304 may simply be returned to a requesting circuit for further processing by the port/PHY that received the frame. In other words, the actual forwarding of a received frame or rejection of a received frame may be determined by other logic in the SAS expander based on the permission signal output on path 354.

Elements 308 through 318 thus represent pipelined logic adapted to assure proper sequencing in the operations of CAM 302 and zone permissions table 304 to obtain and resolve both the source and destination addresses from a received SAS frame to generate corresponding source and destination zone group IDs.

In another exemplary embodiment, CAM 302 may store not only the zone group identifier for an applied device identifier but also routing information used in the SAS expander to determine on which port to forward the received frame for eventual transmission to the identified destination device. Still further, in other exemplary embodiments where the size of CAM 302 needs to be kept smaller or where slower speed operation of CAM 302 presents performance issues, another higher-speed memory structure (e.g., a register file) may be added to the SAS expander for more rapid resolution of device identifiers. For example, all direct attached SAS devices coupled directly to expander ports (as distinct from those coupled indirectly through other expanders of the domain) may be encoded in such a faster, direct-attach memory structure (e.g., direct-attach register file or DAFile). Such direct-attach memory structures are often already present within many SAS expanders for fast determinations of routing to a proper port and may thus be used to also encode zone group identifiers for the direct attached devices. Where such an additional DAFile structure is used in the SAS expander, selection pipelined logic 314 and 316 may be appropriately re-structured to receive another input for a determined source or destination zone group ID, respectively, and may be configured to select among three possible resolutions by an administrative user's configuration instructions and parameters.

Figure 4:
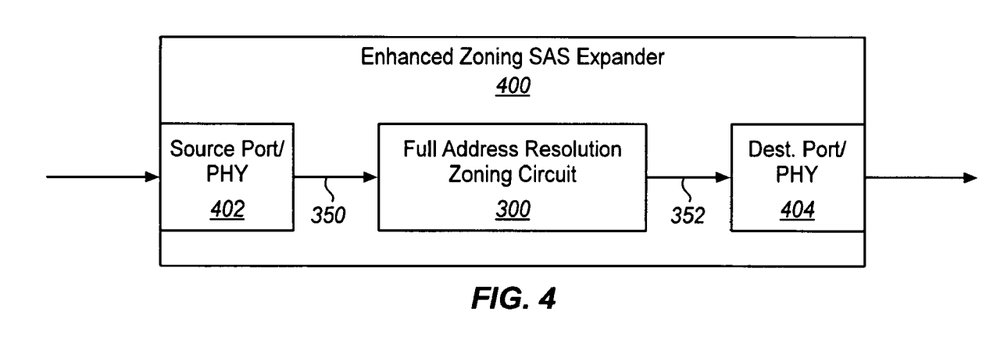
FIGS. 4 and 5 are block diagrams of exemplary embodiments of the zoning circuit of FIG. 3 as may be applied within an enhanced zoning SAS expander in accordance with features and aspects hereof.
Figure 5:
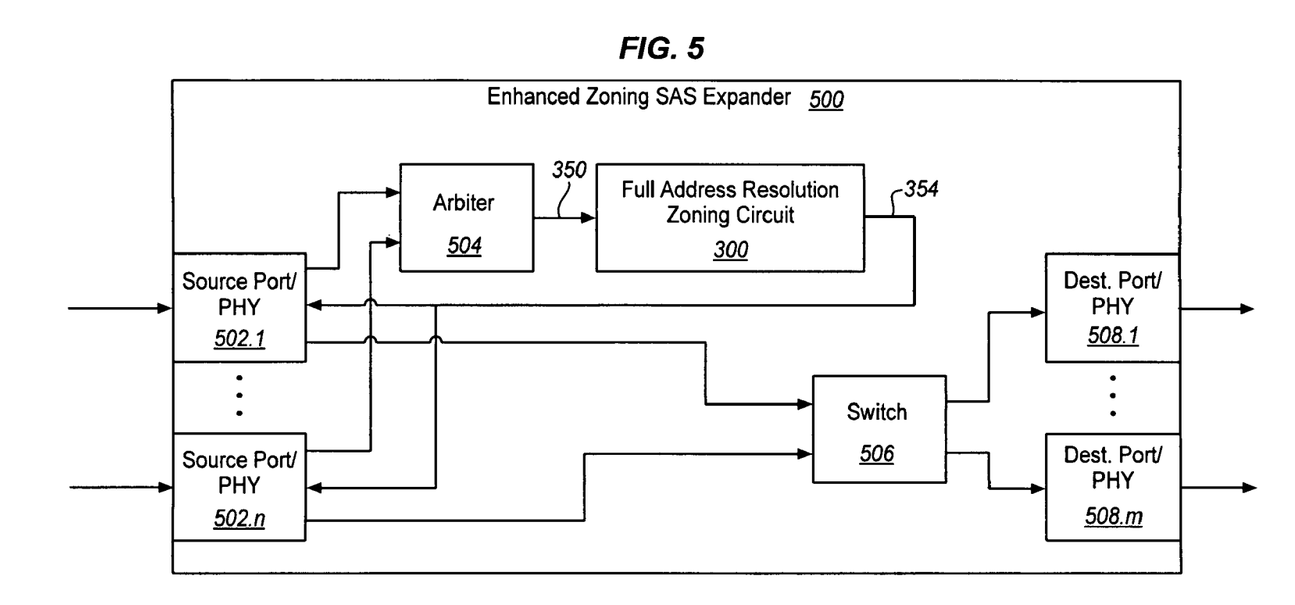

FIGS. 4 and 5 are block diagrams of two exemplary applications of the zoning circuit 300 of FIG. 3 in an enhanced SAS expander. FIG. 4 presents a high level diagram of data flow of a received frame in a zoning SAS expander enhanced in accordance with features and aspects hereof. In FIG. 4, expander 400 includes a zoning circuit 300 logically coupled between a particular source port/PHY 402 and a particular destination port/PHY 404. Logically, a frame is received from a device coupled to the source port/PHY 402 and, based on the zoning determination made by circuit 300, the frame may be forwarded to the appropriate destination port/PHY 404. As shown in FIG. 3, zoning circuit 300 may incorporate logic to receive the frame and to controllably forward the frame to the identified destination port/PHY 404 on behalf of the requesting source port/PHY 402.

FIG. 5 depicts a more typical enhanced SAS expander in which there is a single zoning circuit 300 coupled to each of multiple source ports/PHYs 502.1 . . . 502.n through arbiter 504. When a frame is received, arbiter 504 controls sequenced access to the shared zoning circuit 300 to apply a selected one of potentially multiple received frames to circuit 300 via path/port 350. Circuit 300 makes its determination as regards the permission to forward such a frame from the source port on which it was received to an addressed destination device. The permission signal output applied to path 354 is then returned to logic (not shown) associated with the requesting source port. Based on that returned permission signal, logic (not shown) associated with the requesting source port/PHY (the source port/PHY that received the frame) will either reject the frame or forward the frame on through switch 506 to the appropriate destination port/PHY 508.1 . . . 508.m. In addition, those of ordinary skill in the art will readily recognize that the zoning circuit 300 may be tightly coupled/integrated with route determination circuits within the SAS expander. As noted in such configurations, the CAM structures used in zoning circuit 300 may also be used to store route information for the routing/switching functions of the SAS expander.

Figure 6:
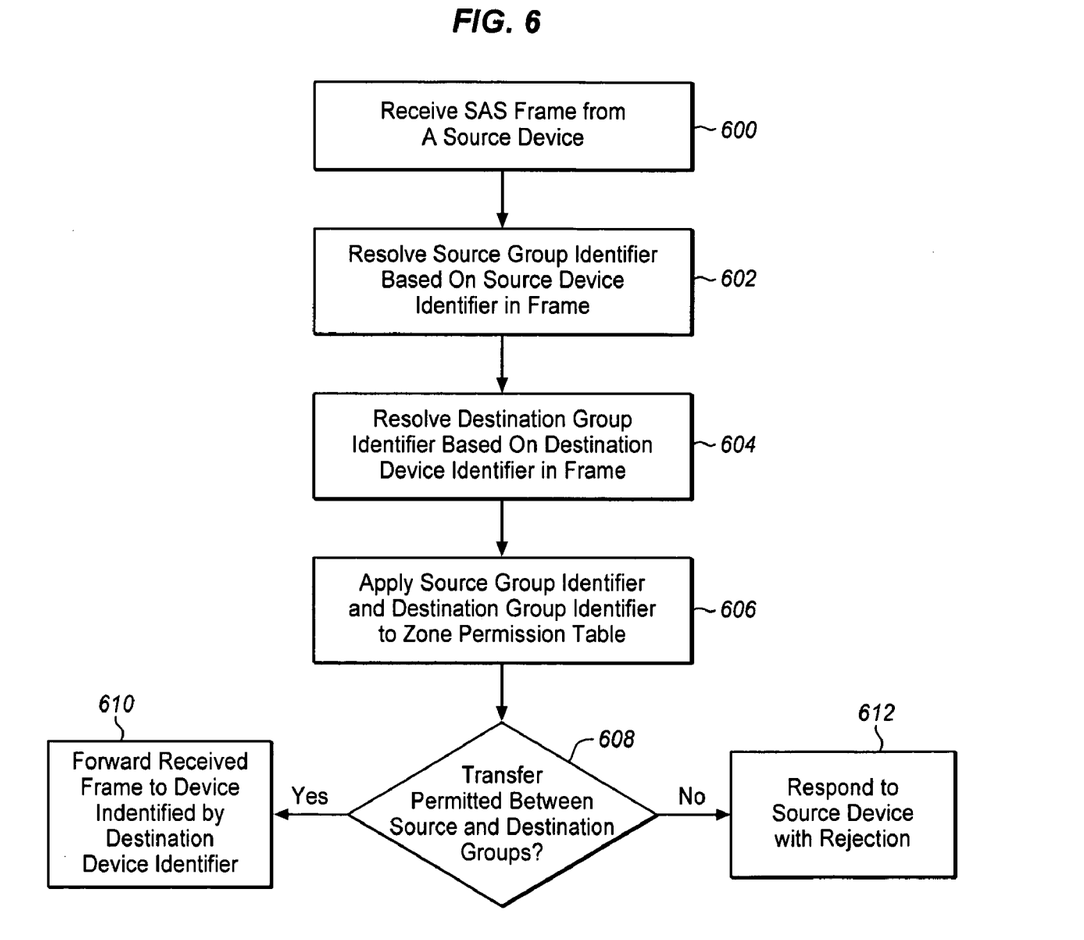
FIGS. 6 and 7 are flowcharts describing exemplary methods of operation in accordance with features and aspects hereof for an enhanced zoning SAS expander.

FIG. 6 is a flowchart describing an exemplary method in accordance with features and aspects hereof for full address resolution in an enhanced SAS expander. At step 600 a SAS frame is received on a port of the expander coupled with a source device (coupled either directly or through one or more intervening other expanders). At step 602 a first device identifier captured from the received frame is resolved to determine a corresponding first zone group identifier (e.g., the source device identifier in the frame is resolved to determine the source zone group identifier). At step 604, the second (e.g., destination) device identifier is resolved to determine the second (e.g., destination) zone group identifier. Having resolved both the source and destination device identifiers to generate corresponding source and destination zone group identifiers, the two zone group identifiers are applied to a zone permission table at step 606 to determine permission for forwarding the received frame to the identified destination device. Step 608 then determines whether permission to forward the frame is granted by the zone permission table. Step 610 forwards the frame if so and step 612 returns to the source device an appropriate error/rejection if not. By contrast to prior techniques, the method of FIG. 6 resolves both the source and destination device identifiers in a received frame to determine the zone group for the source and destination devices.

Figure 7:
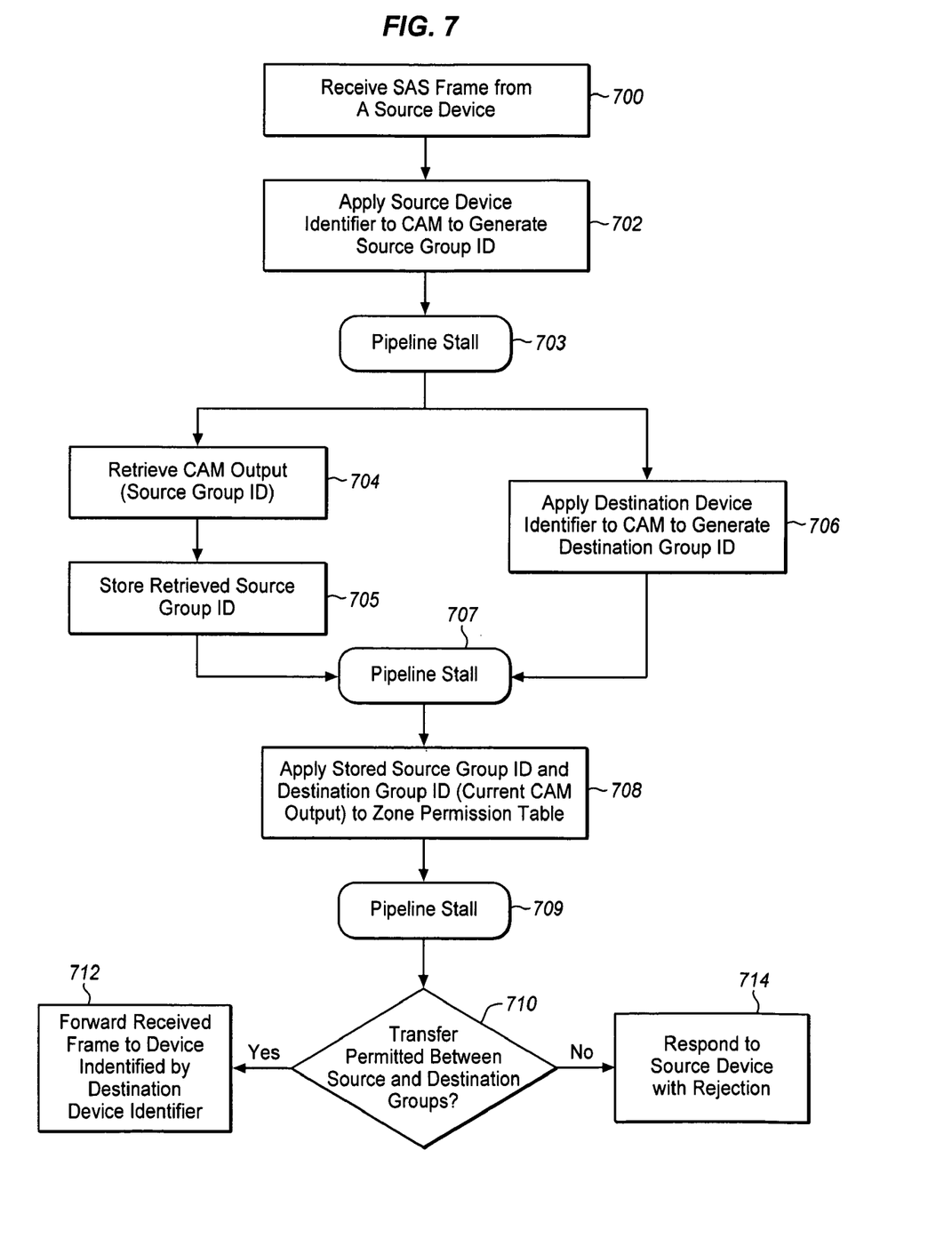

FIG. 7 is a flowchart of another exemplary method in accordance with features and aspects hereof for full address resolution in an enhanced SAS expander. FIG. 7 by contrast with FIG. 6 shows the pipelined delays associated with the pipelined control logic in operation of a zoning circuit such as circuit 300 above. At step 700 a SAS frame is received through an expander port coupled (directly or indirectly) with a source device. At step 702 a first device identifier (e.g., the source device identifier) is captured from the received frame and applied as an input to a memory circuit (e.g., a CAM or content addressable memory circuit).

The memory circuit generates as its output a source zone group identifier (ID). However, the memory circuit may require a full clock cycle (or more) to complete its processing to resolve the applied first device identifier. Step 703 thus causes a stall of further processing in the zoning determination until the memory circuit has sufficiently processed the first applied device identifier to allow application of a next ID. The pipelined stall may be a single clock cycle or any appropriate delay according to the timing design of the memory circuit. Following the appropriate length stall at step 703, step 704 the resolved zone group ID for the first device (e.g., the source zone group ID corresponding to the source device ID) is retrieved as output of the memory circuit. Step 705 stores this source zone group ID for later use. Processing of the source zone group ID is then stalled again at step 707 until the destination zone group ID is determined. Substantially in parallel with the processing of steps 704 and 705 in a first thread, step 706 in a second thread applies the second device identifier (e.g., the destination device identifier) from the received frame to the memory circuit for processing. Processing of the destination zone group ID then stalls for a number of clock cycles at step 707 to allow processing by the memory circuit of the destination device identifier. Those of ordinary skill in the art will recognize that, where a particular memory circuit (e.g., CAM) design requires multiple clock cycles for processing of each applied input, the sequencing of operations of steps 704, 705, and 706 may be suitably adapted. For example, where a particular CAM requires three clock cycles to process a single input, it may none the less receive a next input after the first clock cycle or after the second, etc. The method of FIG. 7 may thus be simply adapted to suit the structure of any particular CAM design. Such modifications of the method to adapt to differing memory circuit timing are well known to those of ordinary skill in the art.

As noted, step 707 represents a further pipeline stall (e.g., for one or more cycles) to permit the CAM to process the second applied device ID (the destination device ID). As above with respect to stalls at step 703, the delay imposed by step 707 represents any suitable number of clock cycle delays to allow the CAM to process resolution of the second address. Following the stall of step 707, step 708 then applies the two zone group IDs (generated by resolving both the source and destination device IDs in a received frame) to the zone permission table. Specifically, the stored source zone group ID is applied to the zone permissions table as a first input and the destination zone group ID presently generated as the output of the CAM (memory circuit) is applied as a second input to the zone permissions table.

Processing of the two parallel threads discussed above is now converged to a single thread awaiting processing of the zone permissions table. Step 709 represents another pipeline stall to permit the zone permission table memory device to process its applied inputs (i.e., the two zone group IDs) and generate an output indicating whether or not the frame is permitted to be forwarded through the expander from the source device to the destination device. As above, step 709 represents any suitable number of clock cycles delay required for the zone permission table memory to process its applied inputs and generate its output permission signal. Step 710 then determines whether the zone permission table output indicates that the frame may be forwarded. If so, step 712 forwards the received frame on an appropriate port of the expander to the destination device. If not, step 714 returns an error indicator (e.g., a rejection) to the source device.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for resolving source and destination information in a zoning SAS expander, the method comprising:
   receiving a frame, the frame including a source identifier identifying the source device and including a destination identifier identifying a destination device;
   resolving the source identifier to generate a source zone group identifier;
   resolving the destination identifier to generate a destination zone group identifier;
   applying the source zone group identifier and the destination zone group identifier to a zone permission table of the zoning SAS expander to determine if forwarding of the frame to the destination device is permitted based on the source zone group identifier and the destination zone group identifier; and
   forwarding the frame to the destination device responsive to a determination that forwarding of the frame is permitted.

2. The method of claim 1 wherein the step of resolving the source identifier further comprises applying the source identifier to a memory circuit to generate the source zone group identifier.

3. The method of claim 2 wherein the memory circuit is a content addressable memory circuit (CAM).

4. The method of claim 2 wherein the step of resolving the destination identifier further comprises applying the destination identifier to the memory circuit to generate the destination zone group identifier.

5. The method of claim 4 further comprising:
   delaying the step of applying the destination identifier to the memory circuit until the source identifier has been resolved by the memory circuit.

6. The method of claim 1 further comprising:
   storing the generated source zone group identifier prior to resolving the destination identifier to generate the destination zone group identifier,
   wherein the step of applying the source zone group identifier and destination zone group identifier further comprises:
   applying the saved source zone group identifier and the destination zone group identifier to the zone permission table.

7. Circuitry in a zoning SAS expander for full zone group identifier resolution in the zoning SAS expander, the circuitry comprising:
   a memory circuit adapted to store zone group identifier information for resolving a device identifier the memory circuit adapted to generate a device zone group identifier output in response to application of a device identifier input;
   control logic coupled with the memory circuit, the control logic adapted to apply a source identifier in a received SAS frame as an input to the memory circuit to generate a source zone group identifier and adapted to apply a destination identifier in the received SAS frame as an input to the memory circuit to generate a destination zone group identifier; and
   a zone permission table coupled with the control logic and coupled with the memory circuit, the zone permission table adapted to receive the source zone group identifier output and the destination zone group identifier output and adapted to determine if the received SAS frame may be forwarded to the device identified by the destination identifier based on the source zone group identifier and the destination zone group identifier,
   wherein the control logic is further adapted to forward the received SAS frame to the device identified by the destination identifier only if the zone permission determines that the received SAS frame may be forwarded to the device identified by the destination identifier.

8. The circuit of claim 7 wherein the memory circuit is a content addressable memory (CAM) circuit.

9. The circuit of claim 8 wherein the control logic further comprises:
   pipeline logic circuits configured to apply the source identifier to the CAM circuit during a first clock cycle of the multiple clock cycles and configured to apply the destination identifier to the CAM circuit during a subsequent clock cycle of the multiple clock cycles and configured to store the source zone group identifier generated by the CAM circuit as the destination zone group identifier is generated by the CAM circuit.

10. The circuit of claim 7 wherein the control logic further comprises:
    source identifier selection logic adapted to selectively override the source zone group identifier generated by the memory circuit and further adapted to generate the source zone group identifier based on information associated with the received SAS frame.

11. The circuit of claim 7 wherein the control logic further comprises:
    destination identifier selection logic adapted to selectively override the destination zone group identifier generated by the memory circuit and further adapted to generate the destination zone group identifier based on information associated with the received SAS frame.

12. The circuit of claim 7 wherein the memory circuit is further adapted to store route information associating a destination identifier with a corresponding port of the SAS expander.

13. A zoning SAS expander comprising:
a first port coupled to receive a SAS frame from a source device;
a second port coupled to forward a received frame to a destination device;
a content addressable memory (CAM) adapted to store zone group identifier information associated with identified devices;
a zone permission table adapted to receive a source zone group identifier associated with a source device identified by a source identifier and adapted to receive a destination zone group identifier associated with a destination device identified by a destination identifier and adapted to determine if a received SAS frame may be forwarded from a source device to a destination device based on a received source zone group identifier and based on a received destination zone group identifier; and
control logic coupled with the first port and the second port and coupled with the CAM and coupled with the zone permission table, the control logic adapted to receive a SAS frame on the first port and adapted to apply a source identifier in the received SAS frame as an input to the CAM to generate a source zone group identifier and adapted to apply a destination identifier in the received SAS frame as an input to the CAM to generate a destination zone group identifier; and further adapted to apply the source zone group identifier to the zone permission table and to apply the destination zone group identifier to the zone permission table, and further adapted to forward the received SAS frame to the device identified by the destination identifier only if the zone permission determines that the received SAS frame may be forwarded to the device identified by the destination identifier.

14. The expander of claim 13 wherein the control logic further comprises:
pipeline logic circuits configured to apply the source identifier to the CAM circuit during a first clock cycle and configured to apply the destination identifier to the CAM circuit during a subsequent clock cycle and configured to store the source zone group identifier generated by the CAM circuit as the destination zone group identifier is generated by the CAM circuit.

15. The expander of claim 13 wherein the control logic further comprises:
source identifier selection logic adapted to selectively override the source zone group identifier generated by the CAM and further adapted to generate the source zone group identifier based on information associated with the received SAS frame.

16. The expander of claim 13 wherein the control logic further comprises:
destination identifier selection logic adapted to selectively override the destination zone group identifier generated by the CAM and further adapted to generate the destination zone group identifier based on information associated with the received SAS frame.

17. The expander of claim 13 wherein the CAM is further adapted to store route information associating a destination identifier with a corresponding port of the SAS expander.

* * * * *